US006877022B1

(12) United States Patent
Toyonoh et al.

(10) Patent No.: US 6,877,022 B1
(45) Date of Patent: Apr. 5, 2005

(54) BOOTH ENCODING CIRCUIT FOR A MULTIPLIER OF A MULTIPLY-ACCUMULATE MODULE

(75) Inventors: Yutaka Toyonoh, Ibaraki (JP); Yasumasa Ikezaki, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 627 days.

(21) Appl. No.: 09/955,993

(22) Filed: Sep. 20, 2001

Related U.S. Application Data

(60) Provisional application No. 60/269,450, filed on Feb. 16, 2001.

(51) Int. Cl.[7] ............................................. G06F 7/52
(52) U.S. Cl. ...................................... 708/628; 708/620
(58) Field of Search ................................. 708/620, 628, 708/629, 523, 625, 632

(56) References Cited

U.S. PATENT DOCUMENTS

| 4,718,031 | A | * | 1/1988 | Nukiyama | ................... | 708/625 |
|---|---|---|---|---|---|---|
| 5,151,875 | A | * | 9/1992 | Sato | ........................... | 708/626 |
| 5,442,576 | A | * | 8/1995 | Gergen et al. | .............. | 708/209 |
| 6,065,032 | A | * | 5/2000 | Nicol | ......................... | 708/628 |
| 6,125,379 | A | * | 9/2000 | Lin | ............................. | 708/627 |
| 6,535,902 | B2 | * | 3/2003 | Goto | .......................... | 708/629 |

OTHER PUBLICATIONS

Kiwon et al., Design of a high performance 32×32 bit multiplier with a novel sign select Booth encoder, 2001, IEEE, pp. 701–704.*
Issam et al., Circuit techniques for CMOS low–power high–performance multipliers, 1996, IEEE Journal of solid–state circuits, vol. 31, No. 10, pp. 1535–1546.*

* cited by examiner

Primary Examiner—Kakali Chaki
Assistant Examiner—Chat Do
(74) Attorney, Agent, or Firm—Robert D. Marshall, Jr.; W. James Brady, III; Frederick J. Telecky, Jr.

(57) ABSTRACT

A Booth encoding circuit includes a plurality of cells (202a–202d), in which at least one of the cells (202c) includes a plurality of inputs. The cell also includes a first plurality of transistors (203) receiving at least one input and forming a NAND logic stage. The cell further includes a second plurality of transistors (211) receiving at least one input and forming an OR logic stage. The cell also includes a first output inverter (222) connected to at least one of the second plurality of transistors (211), and a first switching (224) connected to at least one of the first plurality of transistors (203). The cell further includes a second switching (226) connected to the first output inverter (222), and a second output inverter (228) connected to the first switching (224) and the second switching (226).

18 Claims, 3 Drawing Sheets

BOOTH ENCODING CIRCUIT FOR A MULTIPLIER OF A MULTIPLY-ACCUMULATE MODULE

The present application claims priority from U.S. Provisional Patent Application No. 60/269,450, filed on Feb. 16, 2001 entitled "A Low Power and High performance Multiply Accumulate (MAC) Module," the disclosure of which is incorporated herein by reference in its entirety.

BACKGROUND OF THE INVENTION

1. Field of the Invention

The invention relates generally to the field of multiply accumulate modules. More specifically, the invention is directed towards a Booth encoding circuit within a multiplier of a multiply-accumulate module.

2. Description of Related Art

Known digital systems may multiply two binary numbers, a multiplier binary number and a multiplicand binary number, in a manner similar to the multiplication of two decimal numbers. Specifically, such systems may examine successive bits of the multiplier, beginning with the least significant bit of the multiplier. When the examined multiplier bit is a a multiplicand binary number is copied in its entirety to produce partial products. When the multiplier bit is a "0," zeros are copied to produce partial products. Moreover, the total number of copied zeros is equivalent to the number of bits of the multiplicand binary number. The partial products in successive lines then may be shifted one position to the left relative to the previous line. When all of the multiplier bits have been examined, the partial products in successive vertical lines are summed to produce the resultant product of the multiplier binary number and the multiplicand binary number. Nevertheless, in order to complete the multiplication process, the above-described multiplication process generates a partial product for each multiplier bit.

Some known digital signal processors (DSP's) may be equipped with a multiply-accumulate module for the execution of such multiplication of the multiplier and the multiplicand. The speed of the multiply-accumulate module may affect the operation frequency of the DSP, such that increasing the speed of the multiply-accumulate module also may increase the operation frequency of the DSP. Some known multiply-accumulate modules may include a multiplier. In some known multiply-accumulate modules, the multiplier may account for about half of the delay in the critical path of the multiply-accumulate module. Consequently, increasing the speed the multiplier substantially may increase the overall speed of the multiply-accumulate module.

In order to decrease the number of partial products generated during the multiplication of the multiplier binary number and the multiplicand binary number, some known multipliers may employ a Booth encoding algorithm or method. Reducing the number of partial products may increase the speed of the multiplier. In order to reduce the number of partial products, a known Booth encoding algorithm may recode a radix-2 multiplier Y into a radix-4 multiplier Z with an encoded digital set, {−2, −1, 0, 1, 2}, such that the number of partial products may be reduced by one half.

A Booth encoding circuit may be designed to employ such a Booth encoding algorithm. Referring to FIG. 1, a known Booth encoding circuit 100 is shown. Booth encoding circuit 100 may comprise a plurality of cells 102a-102d and a plurality of inputs $Y_{2n}$, $Y_{2n+1}$, and $Y_{2n-1}$, which may be the $2n^{th}$, $2n^{th}+1$, and $2n^{th}-1$ bits of a multiplier Y, respectively. Inputs $Y_{2n}$ and $Y_{2n-1}$ each may be connected to cells 102b and 102c, and input $Y_{2n-1}$ may be connected to cells 102a, 102c, and 102d. Cell 102c may comprise a first switch 103a and a second switch 103b, each of which may be connected to an input of a NAND gate 104. An output of NAND gate 104 then may be connected to an output inverter 106 of cell 102c, such that the output of cell 102c is located at node 1. In addition, the output of inverter 106 may be indirectly connected to a Booth encoding circuit 100 output inverter 108, such that the output of Booth encoding circuit 100 is located at a node 2.

Moreover, Booth encoding circuit 100 also comprises a plurality of transistor paths between each of the inputs and the output of Booth encoding circuit 100. A path is defined herein as the electrical route over which a particular input signal must travel in order to reach the output of a Booth encoding circuit. A transistor stage level for a particular path is defined herein as the number of transistors through which an input flows in order to reach the output of a Booth encoding circuit. Booth encoding circuit 100 further may comprise at least one "critical transistor stage path," which is defined herein as the path or paths having the greatest transistor stage level between an input and the output of Booth encoding circuit 100.

In Booth encoding circuit 100, the critical path flows through cell 102c, such that the critical path comprises NAND gate 104 and inverter 106. The output signal of inverter 106 maybe logically expressed as inverter 106 output=$(Y_{2n+1} \oplus Y_{2n}) * (\overline{Y_{2n-1} \oplus Y_{2n}})$, where $\oplus$ is the logic symbol for an exclusive OR (XOR) logic gate, * is the logic symbol for an AND logic gate, and the bar is the logic symbol for NOT. Moreover, because NAND gate 104 is connected between inverter 106 and each of switches 103a and 103b, NAND gate 104 drives inverter 106 at least for the critical path of Booth encoding circuit 100. In addition, NAND gate 104 is cascaded with a plurality of p-channel transistors and a plurality of n-channel transistors, such as transistors 110a–110h. Because inverter 106 may drive a number of cells in a Booth decoder circuit (not shown) of the multiplier, as a load capacitance increases, the driving efficiency of cascaded n-channel and p-channel transistors connected to a NAND gate may be reduced, such that the speed of cell 102c also may be reduced.

SUMMARY OF THE INVENTION

Therefore, a need has arisen for compressors that overcome these and other shortcomings of the related art. A technical advantage of the present invention is that the speed of the critical path cell of the Booth encoding circuit may be increased by driving the output inverter of the critical path cell with a second inverter. Specifically, the output inverter of the critical path cell may be driven by the second inverter via a switch, which may be positioned between the inverters.

According to an embodiment of the present invention, a Booth encoding circuit comprises a plurality of cells, in which at least one of the cells comprises a plurality of inputs. The cell also comprises a first plurality of transistors, which form a first logic stage, in which at least one of the inputs is connected to at least one of the first plurality of transistors. The cell further comprises a second plurality of transistors, which form a second logic stage, in which at least one of the inputs is connected to at least one of the second plurality of transistors. The cell also comprises a first output inverter connected to at least one of the second plurality of transistors, and a first switching means connected to at least one of the first plurality of transistors. The cell further comprises a second switching means connected to the first output inverter, and a second output inverter connected to the first switching means and the second switching means. Moreover, within a critical path of the Booth encoding circuit, the first output inverter drives the second output inverter. In one embodiment, the first output inverter drives the second output inverter via the second switching means.

According to another embodiment of the present invention, a multiplier comprises a Booth encoding circuit, which comprises a plurality of cells, in which at least one of the cells comprises a plurality of inputs. The cell also comprises a first plurality of transistors, which form a first logic stage, in which at least one of the inputs is connected to at least one of the first plurality of transistors. The cell further comprises a second plurality of transistors, which form a second logic stage, in which at least one of the inputs is connected to at least one of the second plurality of transistors. The cell also comprises a first output inverter connected to at least one of the second plurality of transistors, and a first switching means connected to at least one of the first plurality of transistors. The cell further comprises a second switching means connected to the first output inverter, and a second output inverter connected to the first switching means and the second switching means. Moreover, within a critical path of the Booth encoding circuit, the first output inverter drives the second output inverter. In one embodiment, the first output inverter drives the second output inverter via the second switching means.

Other features and advantages will be apparent to persons of ordinary skill in the art in view of the following detailed description of the invention and the accompanying drawings.

BRIEF DESCRIPTION OF THE DRAWINGS

For a more complete understanding of the present invention, needs satisfied thereby, and the features and advantages thereof, reference now is made to the following descriptions taken in connection with the accompanying drawings.

DETAILED DESCRIPTION OF PREFERRED EMBODIMENTS

Figure 2:
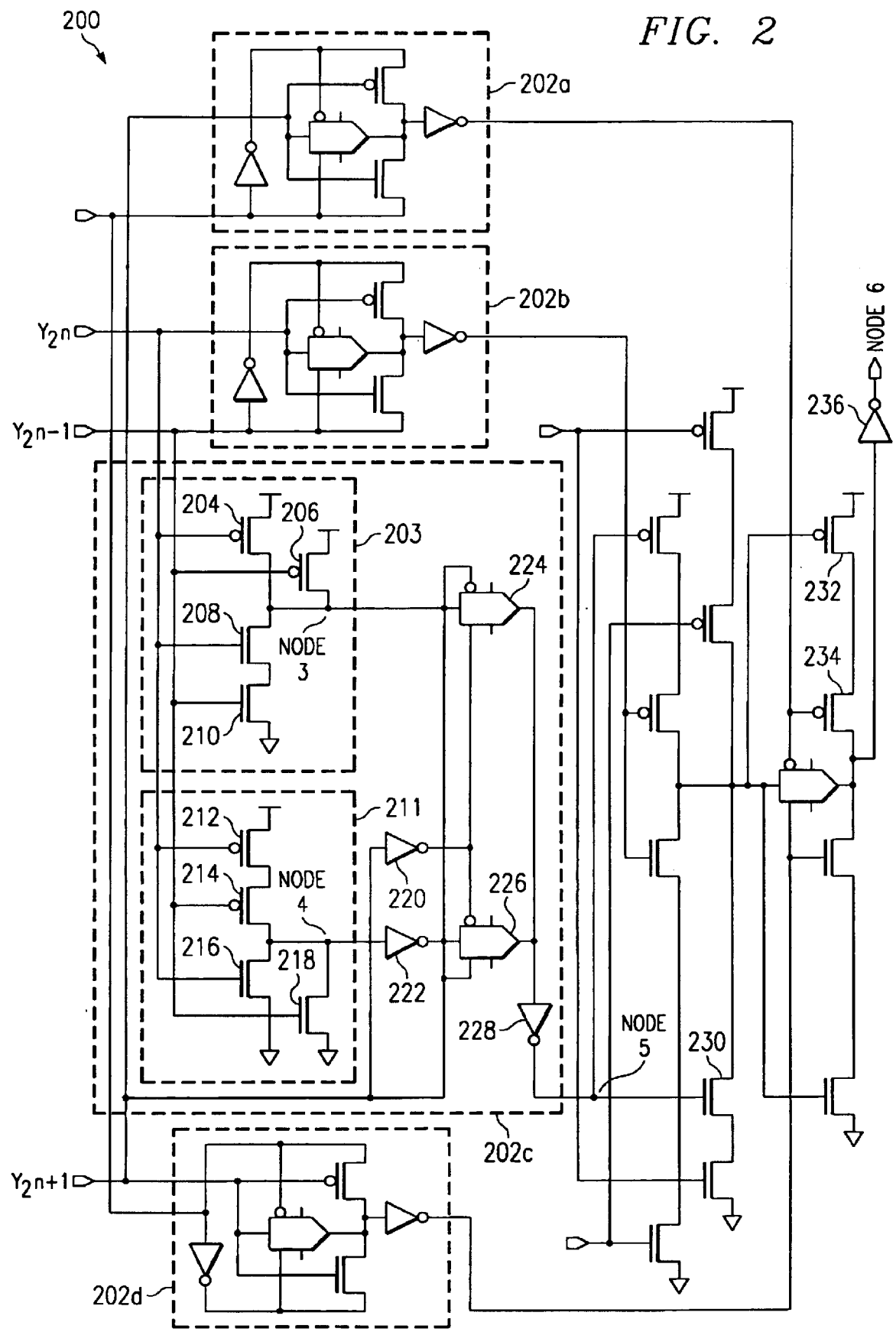
FIG. 2 is a schematic of a Booth encoding circuit according to an embodiment of the present invention.
Figure 3:
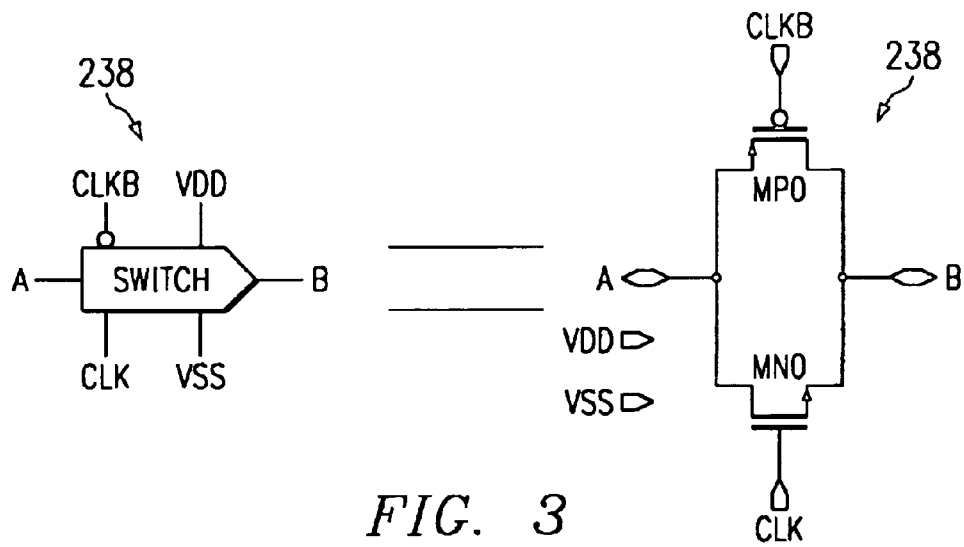
FIG. 3 is a schematic of a transfer gate switch according to an embodiment of the present invention.
Figure 4:
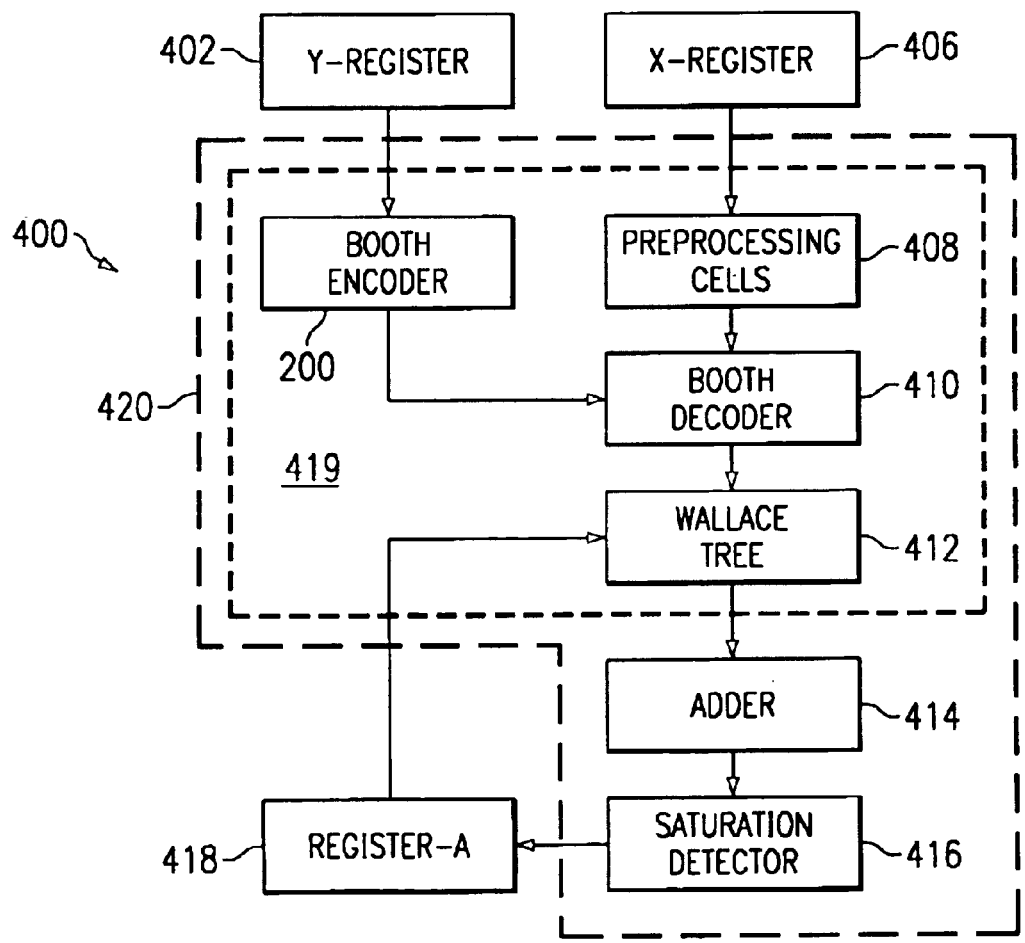
FIG. 4 is a flow-chart of a parallel multiplier according to an embodiment of the present invention.

Preferred embodiments of the present invention and their advantages may be understood by referring to FIGS. 2–4, like numerals being used for like corresponding parts in the various drawings.

Referring to FIG. 4, a flowchart of a parallel multiplier 400 according to an embodiment of the present invention is described. Parallel multiplier 400 may comprise a multiplier register 402, a multiplicand register 406, a result register 418, and a multiply-accumulate module 420, which may comprise a multiplier 419. Multiplier register 402 may comprise a first binary number and multiplicand register 406 may comprise a second binary number. For example, the first binary number may be a 17 bit number and the second binary number also may be a 17 bit number. Moreover, multiplier 419 may multiply the first binary number and the second binary number. Multiplier 419 may comprise a Booth encoder circuit 200, a plurality of pre-processing cells 408, any known Booth decoder circuit 410, any known Wallace tree circuit 412, any known adder circuit 414, and any known saturation detection circuit 416. The possible structures of such known Booth decoders; Wallace trees; adders; and saturation detectors, respectively, will be readily understood by those of ordinary skill in the art. Moreover, those of ordinary skill in the art will understand that parallel multiplier 400 may employ any known Booth encoder; Booth decoder; Wallace tree; adder, and saturation detector, respectively. Therefore, such structures will not be discussed in detail.

Multiplier register 402 may be connected to Booth encoder 200, which may be connected to Booth decoder 410. Multiplicand register 406 may be connected to each pre-processing cell 408, such the second binary number may be pre-processed in each pre-processing cell 408. In addition, each pre-processing cell 408 may be connected to Booth decoder 410. Booth decoder 410 may be connected to Wallace tree 412, which may be connected to adder 414, such that multiplier 419 may multiply the first binary number and the second binary number. Moreover, adder 414 may be connected to saturation detector 416, which may be connected to result register 418, such that the product of the first binary number and the second binary number may be stored in result register 418.

Result register 418 further may be connected to Wallace tree 412, such that a product of a subsequent first binary number and a subsequent second binary number may be added to the previous output stored in result register 418, i.e., the product of the first binary number and the second binary number. As such, the previous output stored in result register 418 may be replaced by a new output from multiply-accumulate module 420. Moreover, the new output from multiply-accumulate module 420 stored in result register 418 may be expressed as An=An−1+Xi*Yi, where An−1 is the output from multiply-accumulate module 420 previously stored in result register 418, Xi*Yi is the product of the first binary number and the second binary number being multiplied by multiply-accumulate module 420, and An is the new value stored in result register 418, which replaces An−1.

Referring to FIG. 2, in each of the above-described embodiments of the present invention, Booth encoder 200 may comprise a plurality of cells 202a-202d, and a plurality of inputs $Y_{2n}$, $Y_{2n+1}$, and $Y_{2n-1}$, which may be the $2n^{th}$, $2n^{th}+1$, and $2n^{th}-1$ bits of a multiplier Y, respectively. Inputs $Y_{2n}$ and $Y_{2n-1}$ each may be connected to cells 202b and 202c, and input $Y_{2n+1}$ may be connected to cells 202a, 202c, and 202d. Cell 202c may comprise a first plurality of transistors 203, which may comprise transistors 204, 206, 208, and 210.

Transistors 204 and 206 each may be a p-channel type transistor, such as a p-channel type metal oxide semiconductor (MOS) transistor, or the like. Transistors 208 and 210 each may be a n-channel type transistor, such as a n-channel type MOS transistor, or the like. Moreover, in one embodiment, input $Y_{2n}$ may be connected to transistors 204 and 208, and input $Y_{2n}-1$ may be connected to transistors 206 and 210. A source of transistor 204 may be connected to a high potential $V_{dd}$. Moreover, a drain of transistor 204 may be connected to a drain of transistor 206 and a drain of transistor 208, such that the drain of transistor 206 also may be connected to the drain of transistor 208. The drain of transistor 204, the drain of transistor 206, and the drain of transistor 208 may form a node 3, which may be an output of first plurality of transistors 203. In addition, a source of transistor 208 may be connected to a drain of transistor 210, and a source of transistor 210 may be connected to a low or ground potential.

In operation, when input signals $Y_{2n}$ and $Y_{2n}-1$ each are high signals, i.e., may be logically expressed as a binary "1" signal, transistors 204 and 206 each may be in a non-conductive state. Similarly, transistors 208 and 210 each may be in a conductive state. Consequently, a drain potential of transistor 208 may be a low potential, and the output at node 3 may be a low potential. When input signals $Y_{2n}$ and $Y_{2n}-1$ each are low signals, i.e., may be logically expressed as a binary "0" signal, transistors 204 and 206 each may be in a conductive state. Similarly, transistors 208 and 210 each may be in a non-conductive state. Consequently, a drain potential of transistor 208 may be a high potential, and the output at node 3 may be a high potential. When input signal $Y_{2n}$ is a high signal and input $Y_{2n}-1$ is a low signal, transistors 206 and 208 each may be in a conductive state. Similarly, transistors 204 and 210 each may be in a non-conductive state. Consequently, the drain potential of transistor 206 may retain its high potential and the output at node 3 may be a high potential. When input signal $Y_{2n}$ is a low signal and input $Y_{2n}-1$ is a high signal, transistors 206 and 208 each may be in a non-conductive state. Similarly, transistors 204 and 210 each may be in a conductive state. Consequently, the drain potential of transistor 204 may retain its high potential and the output at node 3 may be a high potential. Because the output at node 3 may be a low potential when input signals $Y_{2n}$ and $Y_{2n}-1$ each are high signals, and may be high potential for all other combinations of input signals $Y_{2n}$ and $Y_{2n}-1$, first plurality of transistors 203 may be a NAND gate logic stage.

Cell 202c also may comprise a second plurality of transistors 211, which may comprise transistors 212, 214, 216, and 218. Transistors 212 and 214 each may be a p-channel type transistor, such as a p-channel type metal oxide semiconductor (MOS) transistor, or the like. Transistors 216 and 218 each may be a n-channel type transistor, such as a n-channel type MOS transistor, or the like. Moreover, in one embodiment, input $Y_{2n}$ may be connected to transistors 212 and 216, and input $Y_{2n-1}$ may be connected to transistors 214 and 218. Moreover, a source of transistor 212 may be connected to a high potential $V_{dd}$, and a drain of transistor 212 may be connected to a source of transistor 214. A drain of transistor 214 may connected to a drain of transistor 216, and also may be connected to a drain of transistor 218, such that the drain of transistor 214, the drain of transistor 216, and the drain of transistor 218 may form a node 4. Moreover, node 4 may be an output of second plurality of transistors 211. In addition, a source of transistor 216 and a source of transistor 218 may be connected to a low or ground potential. In operation, the second plurality of transistors 211 may comprise an NOR gate logic stage. The output at node 4 may be connected to a first output inverter 222, such that the output of first output inverter 222 may be logically expressed as a OR signal.

Cell 202c further may comprise a first switching means 224 and a second switching means 226. First switching means 224 may comprise a first transfer gate switch 238, which is illustrated symbolically and by circuit diagram in FIG. 3, having an input A and an output B. Similarly, second switching means 226 may comprise a second transfer gate switch 238. The output signal at node 3 may be connected to an input of first switching means 224 and the output signal of first output inverter 222 may be connected to an input of second switching means 226. Input signal $Y_{2n+1}$ may be connected to switching means 224 and also may be connected to switching means 226. Input signal $Y_{2n+1}$ further may be connected to an input inverter 220, which may be connected to first switching means 224 and second switching means 226. The output of first switching means 224 and second switching means 226 may be connected to a second output inverter 228. Moreover, the signal at second output inverter is the output signal of cell 202c. Moreover, the output signal of second output inverter 228 may be logically expressed as $Y_{2n+1} * (Y_{2n} * Y_{2n-1}) + Y_{2n+1} * \overline{(Y_{2n} + Y_{2n-1})}$.

In each of the above-described embodiments of the present invention, Booth encoder 200 further may comprise a transistor 230, a transistor 232, a transistor 234, and a Booth output inverter 236. The output signal of Booth output inverter 236 may be the output signal of Booth encoding circuit 200. Booth encoding circuit 200 also may comprise a plurality of transistor paths between each of the inputs and the output of Booth encoding circuit 200. A path is defined herein as the electrical route over which a particular input signal must travel in order to reach the output of a Booth encoding circuit. A transistor stage level for a particular path is defined herein as a number of transistors through which an input flows in order to reach the output of a Booth encoding circuit. Booth encoding circuit 200 further may comprise at least one "critical transistor stage path," which is defined herein as the path or paths having the greatest transistor stage level between an input and the output of Booth encoding circuit 200. For example, input signal $Y_{2n}$ may flow through transistor 212, transistor 214, first output inverter 222, second switching means 226, second output inverter 228, transistor 230, transistor 232, transistor 234, and Booth output inverter 236. Thus, within cell 202c, the transistor stage level for this particular path (A) is five, and within Booth encoding circuit 200, the transistor stage level for this particular path (A) is nine. Moreover, because no other paths within Booth encoding circuit 200 may have a transistor stage level within Booth encoding circuit 200 which is greater than nine, path A also may be a critical transistor stage path for Booth encoding circuit 200.

Moreover, within critical transistor stage path (A) of Booth encoding circuit 200, second output inverter 228 is driven by first output inverter 222 for at least the critical transistor stage path of Booth encoding circuit 200. In one embodiment, second output inverter 228 is driven by first output inverter 222 for at least the critical transistor stage path of Booth encoding circuit 200 via switching means 226.

Figure 1:
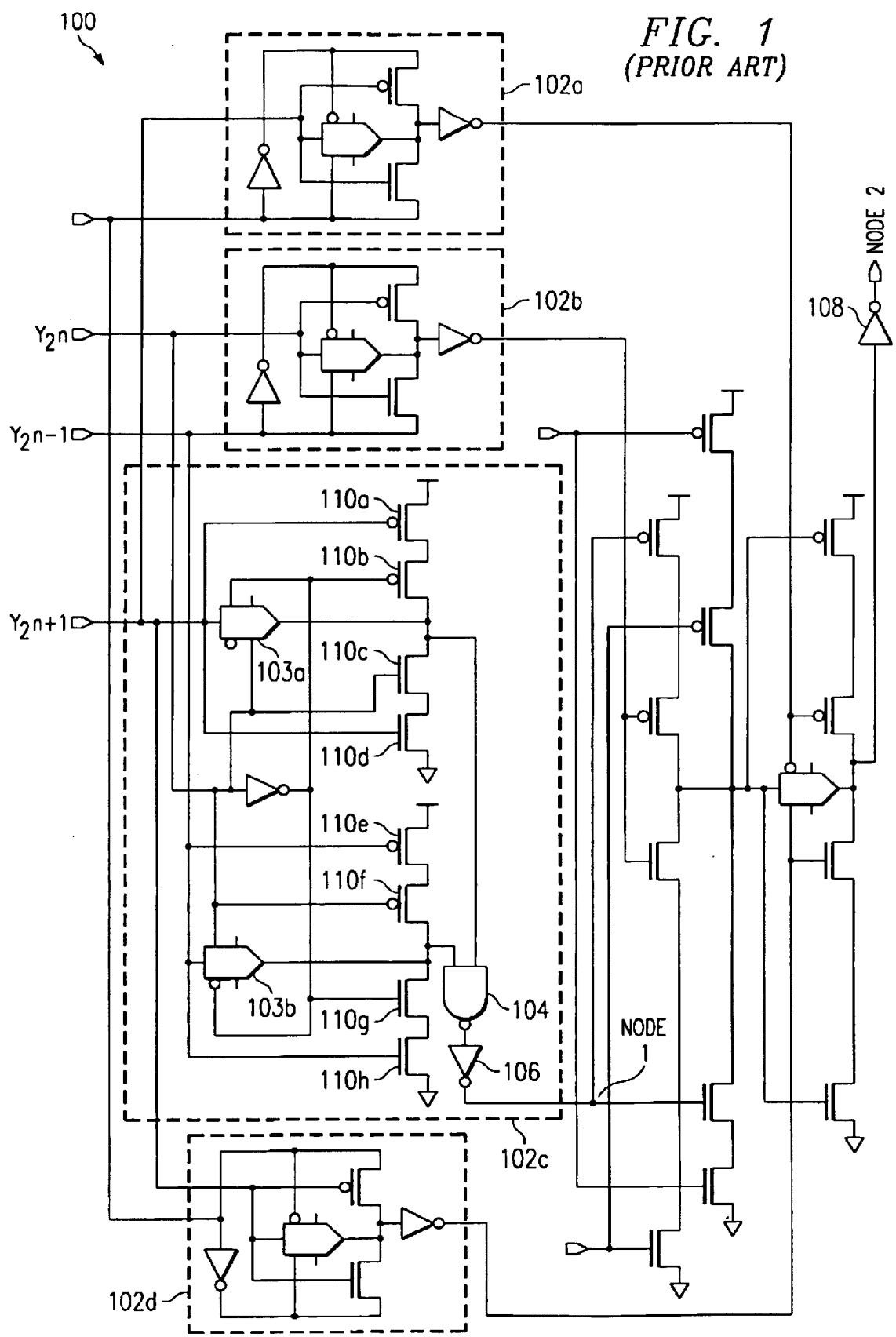
FIG. 1 is a schematic of a known Booth encoding circuit.

For example, an embodiment of the present invention as shown in FIG. 2 was constructed. In this embodiment of the present invention, the speed of cell 202c was 10% faster than the speed of cell 102c, as shown in FIG. 1. Moreover, in this embodiment of the present invention, an amount of power consumed by cell 202c was 8% less than an amount of power consumed by cell 102c, as shown in FIG. 1.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What we claim is:

1. A Booth encoding circuit comprising:
   a plurality of cells, wherein at least one of said cells comprises:

a plurality of inputs;

a first plurality of transistors forming a NAND logic stage, wherein at least one of said inputs is connected to at least one of said first plurality of transistors;

a second plurality of transistors forming an OR logic stage, wherein at least one of said inputs is connected to at least one of said second plurality of transistors;

a first output inverter connected to at least one of said second plurality of transistors;

a first switching means connected to at least one of said first plurality of transistors;

a second switching means connected to said first output inverter;

a second output inverter connected to said first switching means and said second switching means, wherein within a critical path of said Booth encoding circuit said first output inverter drives said second output inverter.

2. The Booth encoding circuit of claim 1, wherein within said critical path of said Booth encoding circuit said first output inverter drives said second output inverter via said second switching means.

3. The Booth encoding circuit of claim 2, wherein said first switching means comprises a first transfer gate switch and said second switching means comprise a second transfer gate switch.

4. The Booth encoder of claim 2, wherein said cell further comprises an input inverter connected to said first switching means and at least one of said inputs.

5. The Booth encoder of claim 4, wherein at least one of said inputs is connected to said second switching means.

6. The Booth encoding circuit of claim 1, wherein said critical path comprises at least two of said second transistors, said first output inverter, said second switching means, and said second output inverter.

7. The Booth encoding circuit of claim 6, wherein a critical path transistor level within said cell is less than six and a critical path transistor level within said Booth encoding circuit is less than ten.

8. The Booth encoding circuit of claim 1, wherein an output of said second output inverter is logically expressed by the formula $\overline{Y_2}*(Y_2*Y_{2n}-1)+Y_{2n+1}, \overline{(Y_{2n+Y_{2n-1}}})}$, wherein said plurality of inputs comprise $Y_{2n}, Y_{2n}-1$, and $Y_{2n}-1$.

9. A multiplier comprising:

A Booth encoding circuit, wherein said Booth encoding circuit comprises a plurality of cells, wherein at least one of said cells comprises:

a plurality of inputs;

a first plurality of transistors forming a first NAND logic stage, wherein at least one of said inputs is connected to at least one of said first plurality of transistors;

a second plurality of transistors forming an OR logic stage, wherein at least one of said inputs is connected to at least one of said second plurality of transistors;

a first output inverter connected to at least one of said second plurality of transistors;

a first switching means connected to at least one of said first plurality of transistors;

a second switching means connected to said first output inverter;

a second output inverter connected to said first switching means and said second switching means, wherein within a critical path of said Booth encoding circuit said first output inverter drives said second output inverter.

10. The multiplier of claim 9, wherein within said critical path of said Booth encoding circuit said first output inverter drives said second output inverter via said second switching means.

11. The multiplier of claim 10, wherein said first switching means comprises a first transfer gate switch and said second switching means comprise a second transfer gate switch.

12. The Booth encoder of claim 10, wherein said cell further comprises an input inverter connected to said first switching means and at least one of said inputs.

13. The Booth encoder of claim 12, wherein at least one of said inputs is connected to said second switching means.

14. The multiplier of claim 9, wherein said critical path comprises at least two of said second transistors, said first output inverter, said second switching means, and said second output inverter.

15. The multiplier of claim 14, wherein a critical path transistor level within said cell is less than six and a critical path transistor level within said Booth encoding circuit is less than ten.

16. The multiplier of claim 10, wherein an output of said second output inverter is logically expressed by the formula $\overline{Y_2}*(Y_2*Y_{2n}-1)+Y_{2n+1}, \overline{(Y_{2n+1}*Y_{2n-1}})}$, wherein said plurality of inputs comprise $Y_{2n}, Y_{2n-1}$, and $Y_{2n+1}$.

17. A multiply-accumulate module comprising:

a multiplier, wherein said multiplier comprises:

A Booth encoding circuit, wherein said Booth encoding circuit comprises a plurality of cells, wherein at least one of said cells comprises:

a plurality of inputs;

a first plurality of transistors forming a NAND logic stage, wherein at least one of said inputs is connected to at least one of said first plurality of transistors;

a second plurality of transistors forming an OR logic stage, wherein at least one of said inputs is connected to at least one of said second plurality of transistors;

a first output inverter connected to at least one of said second plurality of transistors;

a first switching means connected to at least one of said first plurality of transistors;

a second switching means connected to said first output inverter;

a second output inverter connected to said first switching means and said second switching means, wherein within a critical path of said Booth encoding circuit said first output inverter drives said second output inverter.

18. The multiply-accumulate module of claim 17, wherein a critical path transistor level within said cell is less than six and a critical path transistor level within said Booth encoding circuit is less than ten.

* * * * *